(12) United States Patent
Lin

(10) Patent No.: US 7,478,980 B2
(45) Date of Patent: Jan. 20, 2009

(54) CUTTING MACHINE

(75) Inventor: Chang-Yun Lin, Taichung (TW)

(73) Assignee: Rexon Industrial Corp, Ltd., Taichung (TW)

( * ) Notice: Subject to any disclaimer, the term of this patent is extended or adjusted under 35 U.S.C. 154(b) by 0 days.

(21) Appl. No.: 12/000,351

(22) Filed: Dec. 12, 2007

(65) Prior Publication Data

US 2008/0141840 A1 Jun. 19, 2008

(30) Foreign Application Priority Data

Dec. 15, 2006 (TW) .............................. 95146956 A

(51) Int. Cl.
*B23C 1/16* (2006.01)
(52) U.S. Cl. ........................ 409/93; 409/229; 409/137
(58) Field of Classification Search ................. 409/229, 409/228, 85, 93, 94, 116, 134, 137
See application file for complete search history.

(56) References Cited

U.S. PATENT DOCUMENTS

| | | | | |
|---|---|---|---|---|
| 82,145 A | * | 9/1868 | Merrill | 409/93 |
| 2,303,006 A | * | 11/1942 | Swire | 409/93 |
| 2,343,875 A | * | 3/1944 | Schwartz | 409/137 |
| 2,570,700 A | * | 10/1951 | Marcerou | 125/13.01 |
| 2,670,018 A | * | 2/1954 | Coates | 144/223 |
| 2,839,969 A | * | 6/1958 | Anderson | 409/229 |
| 3,498,181 A | * | 3/1970 | Park | 409/93 |
| 4,030,402 A | * | 6/1977 | Onsrud | 409/229 |
| 4,215,960 A | * | 8/1980 | Tsuzuki | 409/121 |
| 5,062,750 A | * | 11/1991 | Oosterhof | 409/229 |
| 2008/0145167 A1 | * | 6/2008 | Lin | 409/218 |

FOREIGN PATENT DOCUMENTS

JP 55-042727 A * 3/1980

* cited by examiner

*Primary Examiner*—Erica E Cadugan
(74) *Attorney, Agent, or Firm*—Bacon & Thomas, PLLC

(57) ABSTRACT

A copy cutting machine includes a base having a worktable, a rack movable on the worktable and for holding a workpiece for cutting. A pointer is movable to trace the contour of a pattern and to guide the movement of the rack subject to the contour of the pattern via a connection bar connected between the rack and the pointer. A rolling cutter is inserted through the worktable and the rack and is rotatable to cut the workpiece carried in the rack. A motor drive is arranged for rotating the rolling cutter. A support arm is fixedly mounted on the base, a first cutter holder is connected to the support arm to hold one end of the rolling cutter, and a second cutter holder is mounted in the base to hold the other end of the rolling cutter.

20 Claims, 4 Drawing Sheets

CUTTING MACHINE

BACKGROUND

1. Field of the Invention

The present invention relates to a cutting machine and more specifically, to a copy cutting machine for cutting a workpiece based on a traced pattern.

2. Description of the Related Art

FIG. 1 is an exploded view of a conventional scroll saw 10. According to this design, the scroll saw 10 comprises a saw blade 12 movable in a vertical direction by a driving mechanism for cutting a workpiece (not shown). The driving mechanism comprises an upper arm 14, a lower arm 16, a connection bar 18, a motor 20, a drive wheel 22, a driven wheel 24, a transmission belt 26, an actuating member 28, and a follower block 30. The drive wheel 22 is coupled to the output shaft of the motor 20. The transmission belt 26 is mounted on the drive wheel 22 and the driven wheel 24. The actuating member 28 is fastened to an eccentric screw hole 32 at the driven wheel 24. The follower block 30 is affixed to the connection bar 18, having a notch 34 that receives the actuating member 28. The connection bar 18 has its two ends respectively connected to one end of the upper arm 14 and one end of the lower arm 16. The other end of the upper arm 14 and the other end of the lower arm 16 are respectively fastened to the two distal ends of the saw blade 12. When the motor 20 is started, the actuating member 28 is forced to rotate eccentrically, causing the upper arm 14 and the lower arm 16 to reciprocate the saw blade 12 in the vertical direction, and therefore the saw blade 12 is forced to cut the workpiece.

The aforesaid scroll saw 10 is functional, however moving the upper arm 14 and the lower arm 16 in vertical direction causes the scroll saw 10 to vibrate and to make noises. Vibration and noises produced during operation of the scroll saw 10 bring great inconvenience and trouble to the user. Further, if the user wishes to cut a number of workpieces into the same final shape, the user must draw the pattern on each of the prepared workpieces and then operate the scroll saw to cut the workpieces one after another. This cutting procedure is complicated.

SUMMARY

The present copy cutting machine has been contemplated in view of these circumstances. Thus a copy cutting machine is disclosed that eliminates the drawbacks of the aforesaid conventional techniques.

To achieve this and to provide a useful copy cutting machine, the disclosed copy cutting machine is designed for cutting a workpiece based on a traced pattern that is maintained separate from the workpiece to be cut. The copy cutting machine includes a base having a worktable, a rack movable on the worktable for holding the workpiece for cutting, a pointer movable to trace the contour of a pattern and to guide movement of the rack subject to the contour of the pattern, and a connection bar connected between the rack and the pointer. A rolling cutter is inserted through the worktable and the rack and is rotatable to cut the workpiece carried in the rack. A motor drive is arranged for rotating the rolling cutter. A support arm is fixedly mounted on the base, a first cutter holder is connected to the support arm to hold one end of the rolling cutter, and a second cutter holder is mounted in the base to hold the other end of the rolling cutter. An exemplary configuration of a suitable cutting machine is described in co-pending application attorney docket no. LINC3269/JJC/ PMB, filed concurrently herewith, which claims priority to Taiwanese application no. 095146957, filed on Dec. 15, 2006, both herein incorporated by reference.

The copy cutting machine uses the rolling cutter to cut the workpiece, which solves the problems of vibration and noises as encountered in the aforesaid prior art design. The copy cutting machine uses the first cutter holder and the second cutter holder to secure the top and bottom ends of the rolling cutter, therefore the rolling cutter does not accidentally break during cutting. The copy cutting machine further provides a rack to hold the workpiece for cutting, and a pointer to guide the cutting subject in accordance with the prepared pattern. When the pointer traces the contour of the pattern, the rack is relatively moved on the worktable, causing the workpiece to be cut subject to the contour of the pattern. Therefore, the copy cutting machine can repeatedly cut multiple workpieces one after another subject to one single pattern, and the user is not required to draw the pattern on each workpiece before cutting.

DETAILED DESCRIPTION

Figure 1:
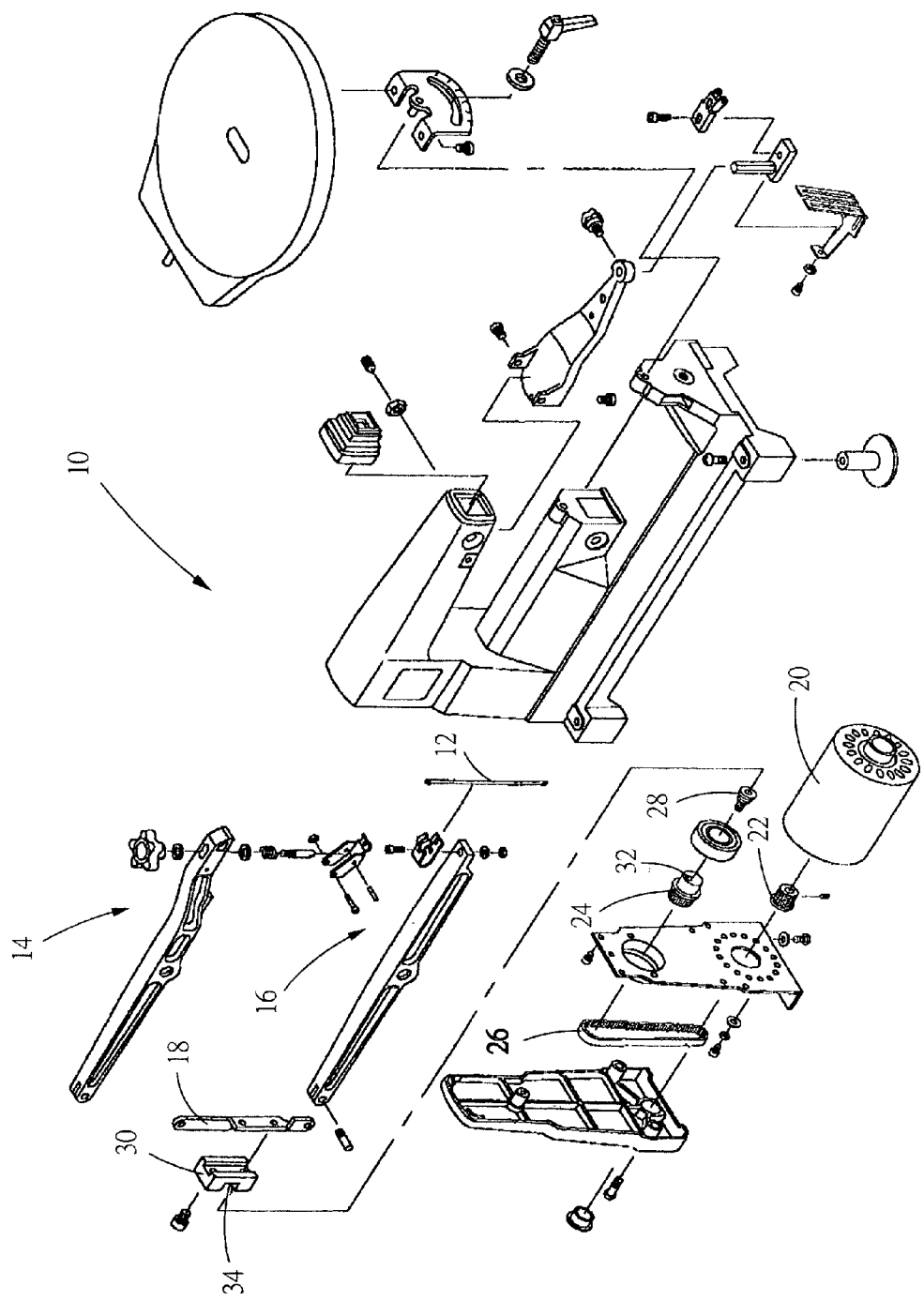
FIG. 1 is an exploded view of a conventional scroll saw.
Figure 2:
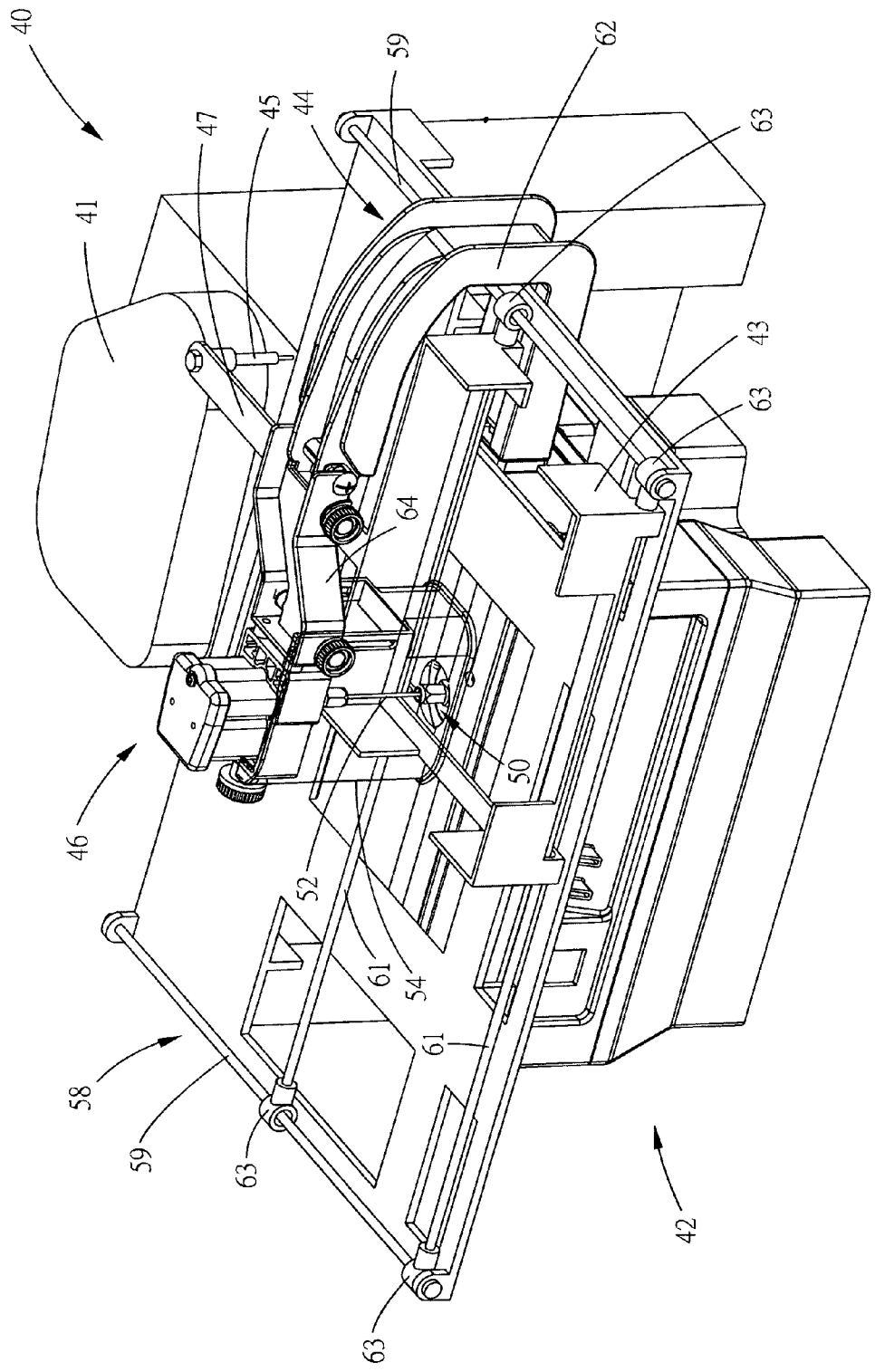
FIG. 2 is a perspective view of an exemplary embodiment of a copy cutting machine.
Figure 3:
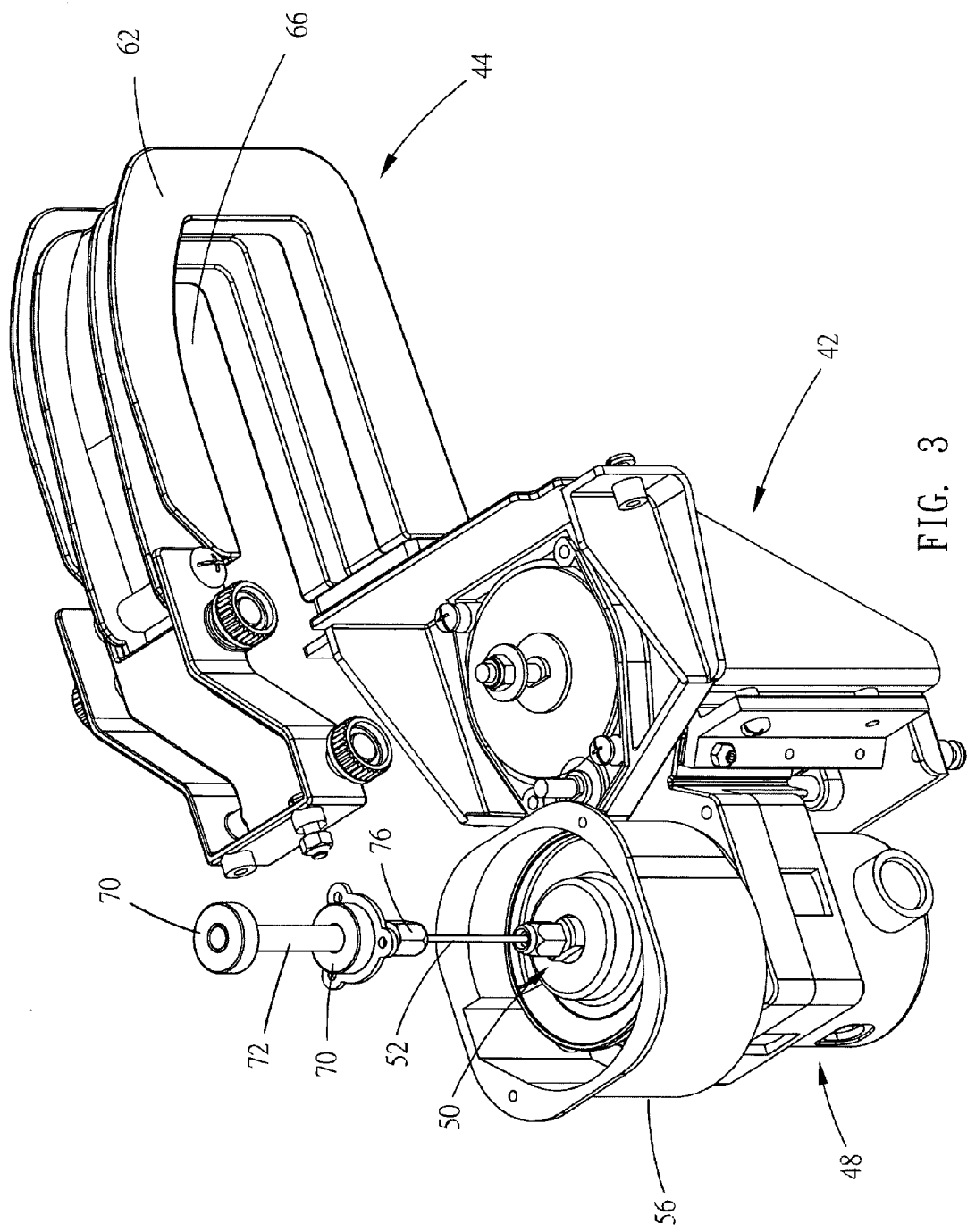
FIG. 3 is an elevational view of a part of the copy cutting machine shown in FIG. 2.

Referring to FIGS. 2 and 3, an exemplary copy cutting machine 40 in accordance with the present disclosure is shown for cutting a workpiece based on a traced pattern 41 that is maintained separate from the workpiece. The pattern 41 can be a three-dimensional model, or a pattern drawn on a plane. The copy cutting machine 40 comprises a base 42, a rack 43, a support arm 44, a pointer 45, a first cutter holder 46, a connection bar 47, a drive 48, a second cutter holder 50, a rolling cutter 52, a limiter 54, and a dust hood 56.

Referring again to FIG. 2, the rack 43 is adapted for holding the workpiece to be cut. The base 42 has a worktable 58. The worktable 58 is provided with two fixed rods 59 and two movable rods 61. The fixed rods 59 are arranged in parallel on the top wall of the worktable 58 at two opposite sides. The movable rods 61 each have two axle bearings 63 at the respective two opposite ends, and the two axle bearings 63 of each movable rod 61 are respectively coupled to the two fixed rods 59. Therefore, the movable rods 61 can be moved along the fixed rods 59 relative to the rolling cutter 52. Further, the movable rods 61 are respectively inserted through the rack 43 and are arranged in parallel, i.e., the rack 43 is mounted on the movable rods 61 and movable with the movable rods 61 along the fixed rods 59 relative to the rolling cutter 52. The connecting bar 47 has one end affixed to the rack 43 and the other end connected to one end of the pointer 45. The pointer 45 is adapted to trace the pattern 41. Further, the pointer 45 is slidable in a vertical direction relative to the connection bar 47, and therefore, the pointer 45 is adjustable to a proper elevation in order to accommodate a three-dimensional pattern. The support arm 44 comprises an arch member 62 and a pivoted member 64. The arch member 62 defines a throat space 66 through which the rack 43 can be moved on the worktable 58. The arch member 62 has one end affixed to one side of the top of the base 42, and the other end suspended above the worktable 58. The pivoted member 64 has one end pivotally connected to the free end of the arch member 62 that is suspended above the worktable 58, and the other end connected to the first cutter holder 46. The first cutter holder 46 is slidable relative to the pivoted member 64.

Figure 4:
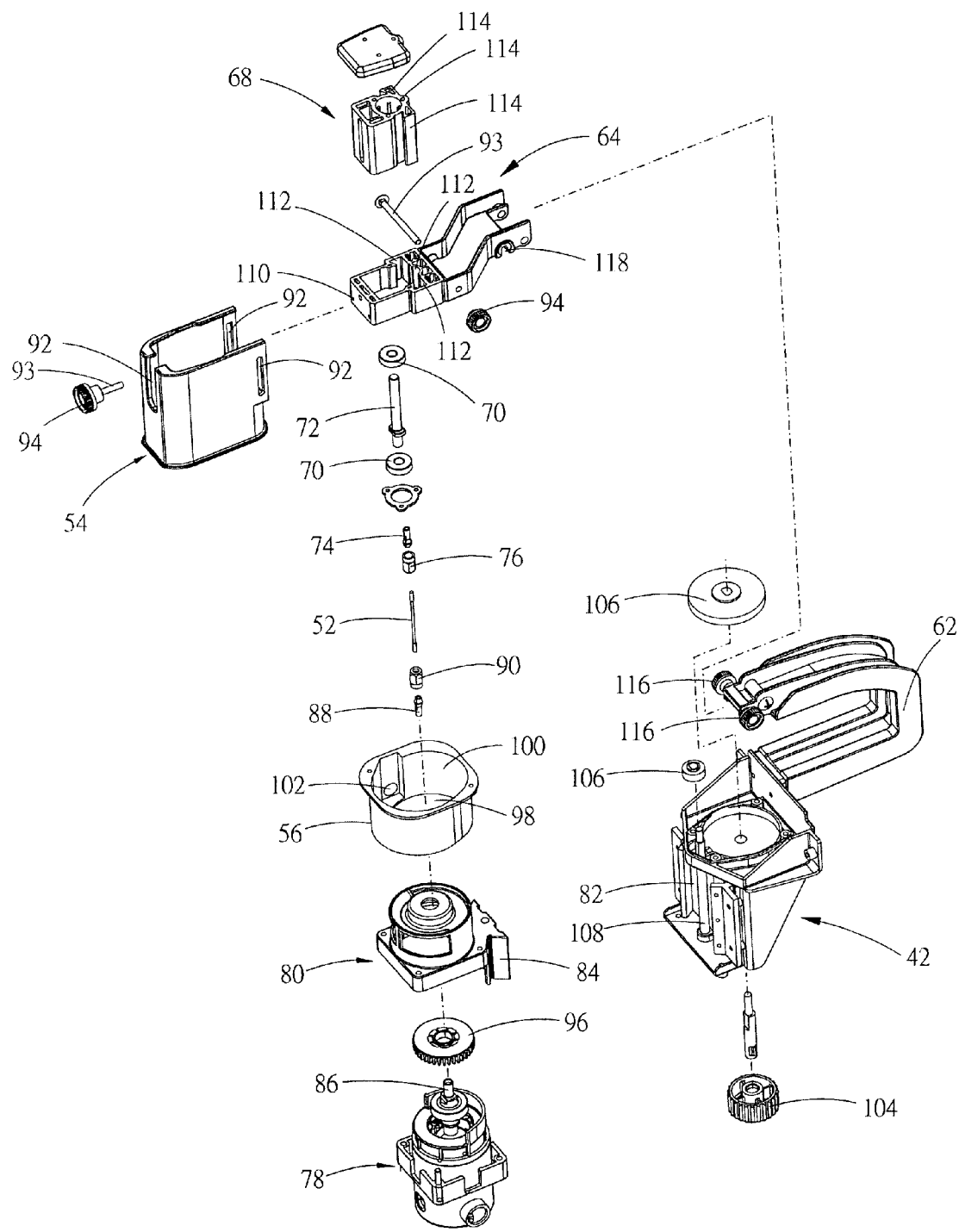
FIG. 4 is an exploded view of a part of the copy cutting machine shown in FIG. 2.

Referring again to FIG. 3 and to FIG. 4, the first cutter holder 46 is adapted to secure one end of the rolling cutter 52, and the mechanism of the first cutter holder 46 that clamps the rolling cutter 52 is rotatable with the rolling cutter 52. This arrangement can be achieved by means of many techniques. According to the exemplary embodiment, the first cutter holder 46 comprises a holder shell 68, two axle bearings 70, a chuck screw rod 72, a first chuck 74, and a first chuck nut 76. The holder shell 68 is fastened to the other end of the pivoted member 64. The two axle bearings 70 are mounted inside the holder shell 68 at different elevations. The chuck screw rod 72 is mounted in the axle bearings 70. The first chuck 74 is inserted into one end of the chuck screw rod 72. The first chuck nut 76 is threadable onto one end of the chuck screw rod 72 to hold the first chuck 74 in the corresponding end of the screw rod 72, selectively forcing the first chuck 74 to clamp the corresponding end of the rolling cutter 52.

The drive 48 is mounted inside the base 42, comprising a motor 78 and a motor mount 80. The motor 78 is fixedly mounted on the motor mount 80. The motor mount 80 is slidably coupled to the base 42. This sliding connection can be achieved by one of many available techniques. According to the exemplary embodiment, the base 42 has two vertically extending sliding grooves 82. The motor mount 80 has two coupling flanges 84 respectively coupled to and movable along the sliding grooves 82.

The second cutter holder 50 is adapted to secure the other end of the rolling cutter 52, and is rotatable with the output shaft 86 of the motor 78. This arrangement can be achieved by means of various techniques. According to the exemplary embodiment, the second cutter holder 50 comprises a second chuck 88 and a second chuck nut 90. The second chuck 88 is inserted into one end of the output shaft 86 of the motor 78. The second chuck nut 90 is threadable onto the end of the output shaft 86 of the motor 78 to hold the second chuck 88 in the end of the output shaft 86 of the motor 78, selectively forcing the second chuck 88 to clamp the other end of the rolling cutter 52.

Referring again to FIGS. 2 and 4, the rolling cutter 52 is inserted through the worktable 58 and the rack 43 in direction perpendicular to the worktable 58, having one end fastened to the first cutter holder 46 and other end fastened to the second cutter holder 50. When the motor 78 is started to rotate the output shaft 86, the second cutter holder 50 is driven by the output shaft 86 of the motor 78 to rotate the rolling cutter 52, causing the rolling cutter 52 to cut the workpiece. Further, when the motor mount 80 is moved vertically along the sliding grooves 82 of the base 42, the rolling cutter 52 is relatively moved in the vertical direction, avoiding cutting of the workpiece via continuous engagement with the same part of the rolling cutter 52. Therefore, this arrangement prolongs the life of the rolling cutter 52.

The limiter 54 is connected to the pivoted member 64 to limit the vertical moving range of the workpiece above the worktable 58. According to the exemplary embodiment, the limiter 54 is a guard. The guard 54 has a plurality of vertically extending slots 92. The pivoted member 64 is provided with screw bolts 93 and locknuts 94. The screw bolts 93 are respectively inserted through the vertically extending slots 92 of the guard 54. The locknuts 94 are respectively threaded onto the screw bolts 93. When the guard 54 contacts the workpiece positioned between the worktable 58 and the guard 54, the locknuts 94 are fastened tight to lock the guard 54. When the locknuts 94 are loosened, the guard 54 can then be moved vertically relative to the screw bolts 93. After adjustment of the elevational position of the guard 54, the locknuts 94 are fastened tight again. The guard 54 prohibits scattering of waste cut chips or other debris.

Referring again to FIG. 4, the copy cutting machine 40 further comprises a fan 96 that is coupled to and rotatable with the output shaft 86 of the motor 78. The dust hood 56 surrounds the fan 96, and has a bottom opening 98, a dust inlet 100, and an exhaust hole 102. The motor mount 80 blocks the bottom opening 98 of the dust hood 56. The dust inlet 100 is disposed close to the top side of the base 42 for collecting waste cut chips. The exhaust hole 102 is located at the peripheral wall of the dust hood 56 and can be connected to a vacuum cleaner (not shown).

The copy cutting machine 40 further comprises an elevation adjustment mechanism for moving the drive 48 in a vertical direction relative to the base 42 to adjust the distance between the drive 48 and the worktable 58 and to move the rolling cutter 52 in the vertical direction. The elevation adjustment mechanism can be achieved by matching a screw rod with a rack, or a gear with a rack. According to the exemplary embodiment, the elevation adjustment mechanism uses a screw rod to match with a rack. As illustrated in FIG. 4, the elevation adjustment mechanism comprises a rotary knob 104, two gears 106, a rack (not shown), and a screw rod 108. The rotary knob 104 is inserted through the base 42 and is affixed to the center of one side of one gear 106. The screw rod 108 is meshed with the rack that is fixedly mounted on the motor mount 80, and is fixedly connected to the center of the other gear 106. The two gears 106 are meshed together. Therefore, when the user rotates the rotary knob 104, the rolling cutter 52 is moved in the vertical direction.

Referring again to FIG. 4, the front side of the pivoted member 64 is provided with a frame 110. The frame 110 has a plurality of vertical guide grooves 112. The holder shell 68 of the first cutter holder 46 has a plurality of vertical rails 114 respectively coupled to the vertical guide grooves 112 to guide the movement of the first cutter holder 46 along the vertical guide grooves 112 relative to the pivoted member 64. This arrangement facilitates replacement of the rolling cutter 52, and adjusts the position of the first cutter holder 46 when the motor mount 80 is driven to move the rolling cutter 52 in the vertical direction.

Referring again to FIG. 4, the pivoted member 64 of the support arm 44 has two coupling notches 118 bilaterally disposed at one end and pivoted to one end of the arch member 62, and the arch member 62 has two locknuts 116 respectively attached to the coupling notches 118 at one side. When the locknuts 116 are fastened tight, the pivoted member 64 is locked to the arch member 62. When it is desired to cut an opening through the workpiece, the first cutter holder 46 is loosened from the rolling cutter 52 and the two locknuts 116 are also loosened. Then the pivoted member 64 is rotated upwards relative to the arch member 62. The workpiece can then be directly cut by an end of the rolling cutter 52.

In conclusion, the copy cutting machine 40 uses the rolling cutter 52 to cut the workpiece, solving the problems of vibration and noises as encountered in the prior art design. The copy cutting machine 40 uses the first cutter holder 46 and the second cutter holder 50 to selectively secure the top and bottom ends of the rolling cutter 52. Because the copy cutting machine 40 holds the two ends of the rolling cutter 52 and not only a single end of the rolling cutter 52, the rolling cutter 52 does not break accidentally during cutting. The copy cutting machine 40 further provides a rack 43 to hold the workpiece for cutting, and a pointer 45 to guide the rack to cut the subject workpiece to the prepared pattern 41. When the pointer 45 traces the contour of the pattern 41, the rack 43 is relatively moved on the worktable 58, causing the workpiece to be cut subject to the contour of the pattern 41. Therefore, the copy cutting machine 40 can repeatedly cut a large number of workpieces subject to one single pattern, and the user is not required to draw the pattern on each workpiece before cutting.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A copy cutting machine for cutting a workpiece based on a traced pattern, the copy cutting machine comprising:
    a base having a worktable;
    a rack movable on said worktable and adapted to hold a workpiece to be cut;
    a pointer movable to trace a contour of a pattern and to guide the movement of said rack subject to the contour of the traced pattern;
    a connection bar connected between said rack and said pointer;
    a rolling cutter having first and second opposed ends and a rotational axis inserted through said worktable and said rack and rotatable on said rotational axis;
    a drive having a motor adapted to rotate said rolling cutter;
    a support arm fixedly mounted on said base;
    a first cutter holder connected to said support arm and arranged for selectively holding the first end of said rolling cutter; and
    a second cutter holder mounted in said base and arranged for selectively holding the second end of said rolling cutter.

2. The copy cutting machine according to claim 1, wherein said worktable comprises two fixed guide rails maintained stationary relative to said rolling cutter and two movable guide rails;
    said rack constrained by said two fixed guide rails to move in a first direction relative to said rolling cutter; said movable guide rails constrained by said two fixed guide rails to move in a second direction relative to said rolling cutter.

3. The copy cutting machine according to claim 2, wherein said two fixed guide rails are arranged in parallel on said worktable at two opposite sides;
    said movable guide rails each have two opposite ends respectively coupled to said two fixed guide rails for movement along said two fixed guide rails.

4. The copy cutting machine according to claim 1, wherein said pointer is slidable relative to said connection bar.

5. The copy cutting machine according to claim 1, wherein said support arm comprises an arch member and a pivoted member, said arch member having a first end affixed to said base and a second end opposite to the first end of said arched member, said pivoted member having a first end pivotally connected to the second end of said arch member and a second end holding said first cutter holder.

6. The copy cutting machine according to claim 1, wherein said drive comprises a motor mounted inside said base, said motor having an output shaft connected to said second cutter holder and adapted to rotate said second cutter holder and said rolling cutter.

7. The copy cutting machine according to claim 6, wherein said drive further comprises a motor mount coupled to, and vertically movable relative to, said base;
    said motor fixedly mounted on said motor mount.

8. The copy cutting machine according to claim 1, wherein said first cutter holder is slidable relative to said support arm.

9. The copy cutting machine according to claim 1, wherein said second cutter holder comprises a chuck and a chuck nut, said chuck disposed between an output shaft of said motor and said chuck nut, said chuck nut threadable onto said output shaft of said motor to secure said rolling cutter to said chuck.

10. The copy cutting machine according to claim 1, further comprising a limiter connected to said support arm and adapted to limit a vertical movement distance of said rack above said worktable.

11. The copy cutting machine according to claim 10, wherein said limiter is slidably connected to said support arm.

12. The copy cutting machine according to claim 1, further comprising a fan and a dust hood surrounding said fan, said fan coupled to an output shaft of said motor and rotatable by said motor, said dust hood having a dust inlet and an exhaust hole, said dust inlet disposed close to said base for collecting waste cut chips.

13. A copy cutting machine for cutting a workpiece based on a traced pattern, the copy cutting machine comprising:
    a base having a worktable;
    a rack movable on said worktable and adapted to hold a workpiece to be cut;
    a pointer movable to trace a contour of a pattern and to guide the movement of said rack subject to the contour of the traced pattern;
    a connection bar connected between said rack and said pointer;
    a rolling cutter having first and second opposed ends and a rotational axis inserted through said worktable and said rack and rotatable on said rotational axis;
    a drive having a motor adapted to rotate said rolling cutter;
    a support arm having an arch member and a pivoted member, said arch member having a first end affixed to said base and a second end opposite to the first end of said arched member, said pivoted member having a first end pivotally connected to the second end of said arch member;
    a first cutter holder connected to said pivoted member and arranged for selectively holding the first end of said rolling cutter; and
    a second cutter holder mounted in said base and arranged for selectively holding the second end of said rolling cutter.

14. The copy cutting machine according to claim 13, wherein said worktable comprises two fixed guide rails maintained stationary relative to said rolling cutter and two movable guide rails;
    said rack constrained by said two fixed guide rails to move in a first direction relative to said rolling cutter; said movable guide rails constrained by said two fixed guide rails to move in a second direction relative to said rolling cutter.

15. The copy cutting machine according to claim 14, wherein said two fixed guide rails arranged in parallel on said worktable at two opposite sides;
    said movable guide rails each have two opposite ends respectively coupled to said two fixed guide rails for movement along said two fixed guide rails.

16. The copy cutting machine according to claim 13, wherein said drive further comprises a motor mount coupled to, and vertically movable relative to, said base;

said motor fixedly mounted on said motor mount.

17. The copy cutting machine according to claim 13, wherein said first cutter holder is slidable relative to said support arm.

18. The copy cutting machine according to claim 13, further comprising a limiter connected to said support arm and adapted to limit a vertical movement distance of said rack above said worktable.

19. The copy cutting machine according to claim 18, wherein said limiter is a guard slidably connected to said support arm.

20. The copy cutting machine according to claim 13, further comprising a fan and a dust hood surrounding said fan, said fan coupled to an output shaft of said motor and rotatable by said motor, said dust hood having a dust inlet and an exhaust hole, said dust inlet disposed close to said base for collecting waste cut chips.

* * * * *